United States Patent
Ohol et al.

(10) Patent No.: US 11,528,165 B2
(45) Date of Patent: Dec. 13, 2022

(54) REMOTE SENSOR DATA ACQUISITION

(71) Applicant: Textron Aviation Inc., Wichita, KS (US)

(72) Inventors: Joseph Andrew Ohol, Sedgwick, KS (US); Robin L. Young, Wichita, KS (US)

(73) Assignee: TEXTRON INNOVATIONS, INC., Providence, RI (US)

( * ) Notice: Subject to any disclaimer, the term of this patent is extended or adjusted under 35 U.S.C. 154(b) by 0 days.

(21) Appl. No.: 16/225,056

(22) Filed: Dec. 19, 2018

(65) Prior Publication Data

US 2019/0229947 A1 Jul. 25, 2019

Related U.S. Application Data

(60) Provisional application No. 62/619,272, filed on Jan. 19, 2018.

(51) Int. Cl.
| | |
|---|---|
| *H04L 12/403* | (2006.01) |
| *B64F 5/60* | (2017.01) |
| *H04L 67/12* | (2022.01) |
| *H04L 12/46* | (2006.01) |
| *H04L 12/40* | (2006.01) |

(52) U.S. Cl.
CPC .............. *H04L 12/403* (2013.01); *B64F 5/60* (2017.01); *H04L 12/4625* (2013.01); *H04L 67/12* (2013.01); *H04L 2012/4028* (2013.01)

(58) Field of Classification Search
CPC ... H04L 12/403; H04L 12/4625; H04L 67/12; H04L 2012/4028; B64F 5/60; B64D 45/00; B64D 31/00; B64D 2045/0085
See application file for complete search history.

(56) References Cited

U.S. PATENT DOCUMENTS

| | | | |
|---|---|---|---|
| 6,035,240 A | 3/2000 | Moorehead et al. | |
| 6,047,222 A | 4/2000 | Burns et al. | |
| 6,760,309 B1* | 7/2004 | Rochberger | H04L 29/06027 370/229 |
| 8,311,778 B2 | 11/2012 | Bronczyk et al. | |
| 2008/0162972 A1* | 7/2008 | Liu | G06F 1/206 713/324 |
| 2009/0222148 A1* | 9/2009 | Knotts | G05D 1/0038 701/2 |

(Continued)

*Primary Examiner* — Scott B Christensen
(74) *Attorney, Agent, or Firm* — Avek IP, LLC

(57) ABSTRACT

A remote sensor data acquisition system for an aircraft includes a plurality of remote sensors co-located onboard the aircraft and adapted to measure one or more aircraft-related parameters. A remote sensor interface is co-located with the plurality of remote sensors. The remote sensor interface includes a communication bus having a plurality of nodes to transmit data from the plurality of remote sensors. A plurality of subsystems are each adapted to receive data from the plurality of remote sensors simultaneously and in real time via the remote sensor interface. A remote sensor data acquisition method for an aircraft includes sensing one or more parameters onboard the aircraft via a plurality of remote sensors and transmitting sensor data from the plurality of remote sensors to a plurality of subsystems independently and in real time via a remote sensor interface.

19 Claims, 3 Drawing Sheets

(56) References Cited

U.S. PATENT DOCUMENTS

| | | | | |
|---|---|---|---|---|
| 2010/0025544 | A1* | 2/2010 | Beaufrere | B64D 31/00 |
| | | | | 244/76 R |
| 2012/0016623 | A1* | 1/2012 | Hayner | G01N 27/4163 |
| | | | | 702/145 |
| 2012/0176124 | A1* | 7/2012 | Szulyk | G01B 7/003 |
| | | | | 324/207.18 |
| 2014/0067192 | A1* | 3/2014 | Yousuf | B60W 50/029 |
| | | | | 701/31.4 |
| 2014/0281130 | A1* | 9/2014 | Ellerbrock | H04L 12/40013 |
| | | | | 711/103 |
| 2014/0297155 | A1* | 10/2014 | Chen | F02C 9/28 |
| | | | | 701/100 |
| 2014/0365702 | A1* | 12/2014 | Ray | G06F 13/4068 |
| | | | | 710/305 |
| 2015/0042321 | A1* | 2/2015 | Yazdani | G01D 5/2006 |
| | | | | 324/207.18 |
| 2016/0214730 | A1 | 7/2016 | Nouhaud | B64D 31/04 |
| 2016/0334786 | A1* | 11/2016 | Warpinski | G05D 1/0022 |
| 2017/0168975 | A1* | 6/2017 | Heinrichs | H05K 7/1492 |
| 2017/0208420 | A1* | 7/2017 | Wang | H04W 4/70 |
| 2018/0284735 | A1* | 10/2018 | Celia | G05B 23/0289 |
| 2018/0288080 | A1* | 10/2018 | Keller | H04L 63/1425 |
| 2019/0109600 | A1* | 4/2019 | Liaghati | H04L 1/004 |
| 2019/0112050 | A1* | 4/2019 | Ibrahim | G06N 20/00 |
| 2019/0163178 | A1* | 5/2019 | Sidle | G01S 15/87 |

* cited by examiner

REMOTE SENSOR DATA ACQUISITION

CROSS-REFERENCE TO RELATED APPLICATIONS

This application claims the benefit of U.S. Provisional Patent Application Ser. No. 62/619,272 entitled Remote Sensor Data Acquisition and filed Jan. 19, 2018, the disclosure of which is herein incorporated by reference in its entirety.

BACKGROUND

1. Field of the Disclosure

Embodiments of this disclosure relate generally to embedded electronics, and more specifically to remote sensor data acquisition for critical systems electronics.

2. Description of the Related Art

U.S. Pat. No. 6,035,240 to Moorehead et al. discloses a distributed processing system for sensor data acquisition and control; however, Moorehead does not include a multiple controller architecture.

U.S. Pat. No. 8,311,778 to Bronczyk et al. discloses a control transmitter with multiple sensors; however, Bronczyk does not support full time sensor availability, nor multiple sensors on one bus, nor does it support multiple bus controllers.

U.S. Pat. No. 6,047,222 to Burns et al. discloses a process control network with redundant field devices and buses; however, Burns does not include a multiple controller architecture. Also, Burns requires redundant sensors and data flow is via two-way communication.

SUMMARY

In an embodiment, a remote sensor data acquisition system for an aircraft is provided. The system includes a plurality of remote sensors co-located onboard the aircraft and adapted to measure one or more aircraft-related parameters. A remote sensor interface is co-located with the plurality of remote sensors. The remote sensor interface includes a communication bus having a plurality of nodes to receive data from the plurality of remote sensors. A plurality of subsystems are each adapted to receive data from the plurality of remote sensors simultaneously and in real time via the remote sensor interface.

In another embodiment, a remote sensor data acquisition method for an aircraft is provided. The method includes providing a remote sensor interface co-located with a plurality of remote sensors onboard the aircraft. The remote sensor interface comprises a communication bus adapted to accommodate a plurality of nodes. The method further includes sensing one or more parameters onboard the aircraft via the plurality of remote sensors and transmitting sensor data from the plurality of remote sensors to a plurality of subsystems independently and in real time via the plurality of nodes.

In yet another embodiment, a remote sensor data acquisition system onboard an aircraft is provided. The system includes a first plurality of sensors co-located in a first location for measuring a plurality of parameters, respectively. A first remote sensor interface is co-located in the first location with the first plurality of sensors, the first remote sensor interface being adapted to provide data from each of the first plurality of sensors independently to a plurality of subsystems in a first time slot. A second plurality of sensors is co-located in a second location, distal from the first location, for measuring a plurality of parameters, respectively. A second remote sensor interface is co-located in the second location with the second plurality of sensors, the second remote sensor interface being adapted to provide data from each of the second plurality of sensors independently to the plurality of subsystems in a second time slot different from the first time slot.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Many conventional embedded electronic systems rely on a vast amount of real-time information provided from analog sensors that measure different parameters at many locations. The embedded control electronics for such systems are either overly redundant (e.g., to accommodate multiple settings or to provide subsystem independence), or the embedded control electronics are developed uniquely for every implementation. Many existing embedded electronics use digital buses that require differential voltages and possess slow transmission rates. Further, these data buses are specific to different industries (e.g., medical, aviation, automotive), and are not available as commercial-off-the-shelf (COTS) integrated circuits (ICs). For use with remote data sensing, the embedded electronics require software or programmable electronic hardware, which may require significant verification and validation effort.

Embodiments of the present disclosure provide a remote sensor data acquisition system that uses a plurality of serial peripheral interface (SPI) buses to operate each sensor remotely and to provide sensor data to a plurality of control devices simultaneously and in real time. Embodiments of the present disclosure also allow multiple sensor interfaces to share the same data bus for sharing sensor data with a plurality of subsystems. Example sensors include but are not limited to light sensors used to determine a need for exterior lighting, position sensors to determine a control-wheel position, and temperature and pressure sensors to provide temperature and pressure from a turbine engine to a full-authority-digital-engine-control (FADEC) subsystem. Example subsystems include but are not limited to entertainment subsystems, HVAC subsystems, lighting subsystems (e.g., exterior and cabin), environmental subsystems, pitch, roll, and yaw control subsystems, spoiler subsystems, flap subsystems, rudder subsystems, horizontal stabilizer subsystems, hydraulic subsystems, landing gear subsystems, a FADEC subsystem, and navigational subsystems. Additionally, the sensor data may be used to determine aircraft control variables such as weight-on-wheels, angle-of-attack, Mach number, dynamic pressure, etc.

Figure 1:
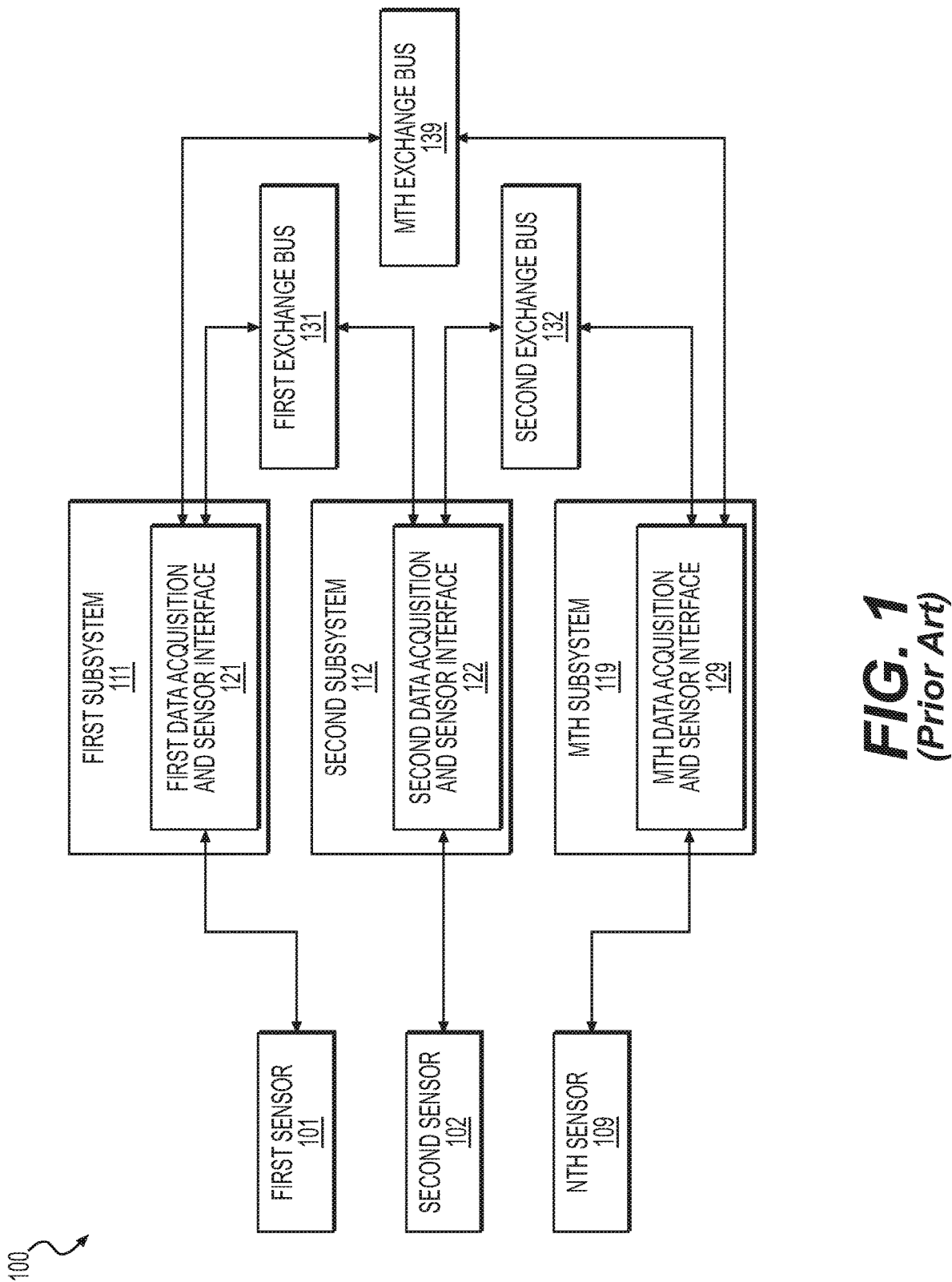
FIG. 1 is a diagram showing a prior art system for sensor data acquisition, in an embodiment.

FIG. 1 is a diagram showing a prior art system 100 for sensor data acquisition. System 100 includes a plurality of N sensors used to measure one or more parameters and provide measurement data from the plurality of N sensors to a plurality of M subsystems, where N and M are non-negative integers. A key feature of system 100 is that each sensor communicates with a subsystem via a dedicated channel for each parameter measured. For example, each of the plurality of N sensors is adapted to measure a single parameter, which may be the same for each of the plurality of N sensors or the plurality of N sensors may be used to measure different parameters. Exemplary parameters include light intensity, position, velocity, acceleration, humidity, temperature, pressure, fluid level etc.

In the embodiment depicted in FIG. 1, the plurality of N sensors includes a first sensor 101, a second sensor 102, and so on up to an Nth sensor 109. The first sensor 101 is communicatively coupled with a first subsystem 111 via a first data acquisition and sensor interface 121, the second sensor 102 is communicatively coupled with a second subsystem 112 via a second data acquisition and sensor interface 122, and so on up to the Nth sensor 109, which is communicatively coupled with an Mth subsystem 119 via an Mth data acquisition and sensor interface 129. In the embodiment depicted in FIG. 1, N equals M such that each sensor is communicatively coupled with a respective subsystem. However, in some embodiments, N is greater than M such that more than one sensor is communicatively coupled to a subsystem.

Exchange of data (e.g., local sensor values) between each pair of subsystems is performed by a device adapted to transfer data between different components, such as an exchange bus. In an embodiment, a first exchange bus 131 is used to exchange data between first data acquisition and sensor interface 121 and second data acquisition and sensor interface 122. In an example for an aircraft, subsystem 111 is a full-authority-digital-engine-control (FADEC) Channel A and subsystem 112 is a FADEC Channel B. Sensors 101 and 102 are independent throttle lever angle measurement devices. FADEC Channel A and FADEC Channel B trade data from sensors 101 and 102 over data exchange bus 131. Similarly, a second exchange bus 132 may be used to exchange data between second data acquisition and sensor interface 122 and Mth data acquisition and sensor interface 129, and so on.

By definition, remote sensors are located distally from subsystems that receive sensor data. For example, engine-indicating sensors are located in an aircraft engine while a flight controller that receives engine-indicating data may be located in a cockpit. In system 100, the data acquisition and sensor interfaces are co-located with the subsystems. This configuration requires a large number of wires to be run a relatively longer distance from the sensors to the data acquisition and sensor interfaces which causes a weight penalty and environmental complications due to electromagnetic interference (EMI). System 100 includes additional disadvantages such as a high cost associated with a large number of sensors and associated connections. Additionally, comparison of data between sensors measuring the same parameter introduces an uncertainty. Because each subsystem is configured independently, arrival times of data transferred between any of the subsystems (e.g., via exchange buses) is not guaranteed and the sensor data may be randomly old. When parameters being measured (e.g., direction and speed) are rapidly changing, correlation between the sensors is much more difficult to achieve due to a transfer repetition rate of sensor data on cross-channel buses.

System 100 also provides an inherent reliance on subsystem communication for sensor data. In other words, first subsystem 111 (e.g., a FADEC channel A) receives data from its throttle-lever-angle sensor and second subsystem 112 (e.g., a FADEC channel B) receives data from its throttle-lever-angle sensor, and each subsystem relies on the other for data from its respective throttle-lever-angle sensor.

Figure 2:
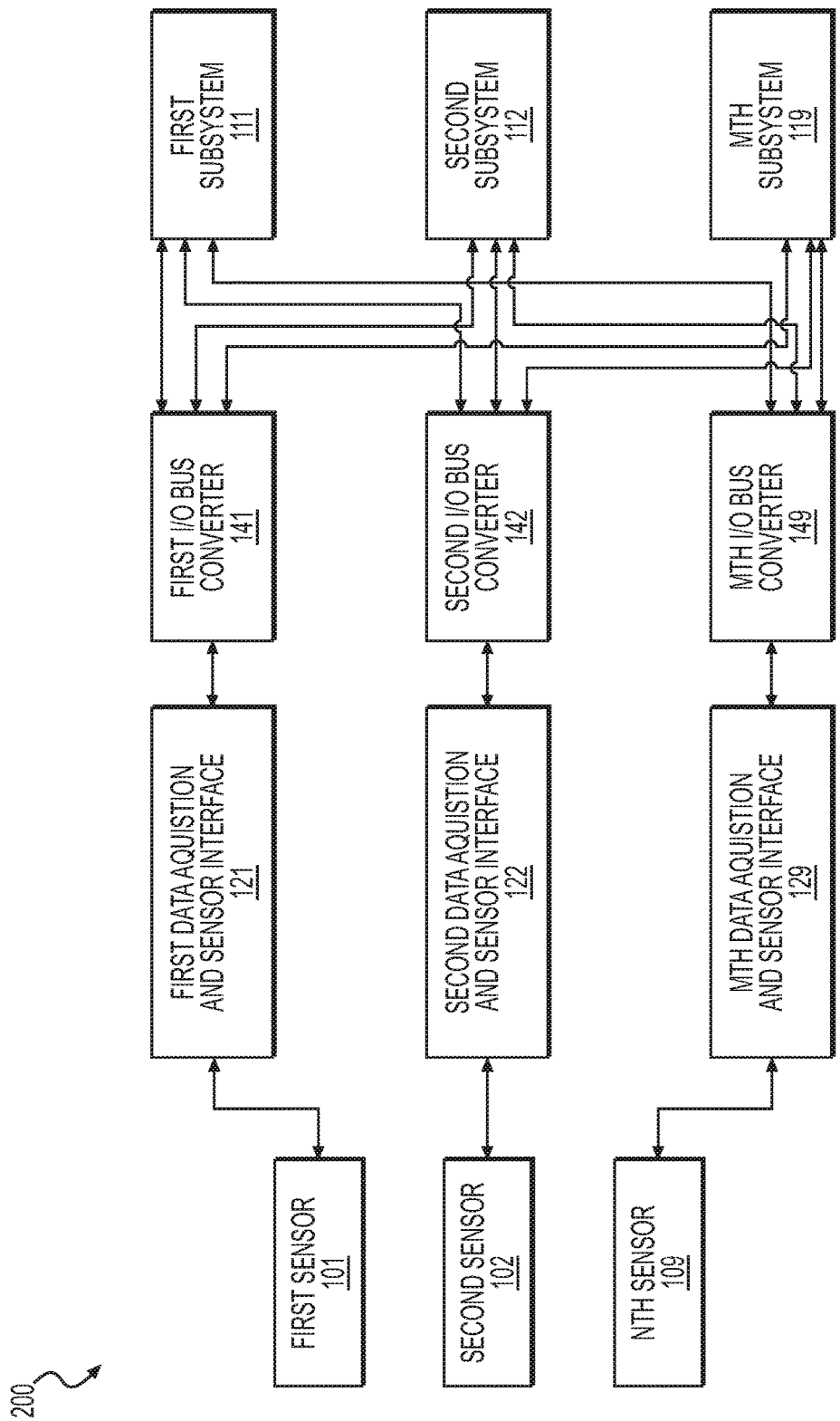
FIG. 2 is a diagram showing a prior art network distributed system for sensor data acquisition, in an embodiment.

FIG. 2 is a diagram showing a prior art network distributed system 200 for sensor data acquisition. Similar to system 100, one or more parameters are measured with the plurality of N sensors 101-109. As depicted in the embodiment of FIG. 2, each of the plurality of N sensors 101-109 is communicatively coupled via a dedicated channel with a respective one of the plurality of M data acquisition and sensor interfaces 121-129. A plurality of Input/Output (I/O) bus converters 141, 142, . . . 149 enable sensor data to be shared between subsystems. Similar to system 100, system 200 may include the same number of sensors as subsystems (N equals M), or a greater number of sensors may be included (N is greater than M), without departing from the scope hereof.

The data acquisition and sensor interfaces in system 200 may be located closer to one or more sensors compared to system 100. However, similar to system 100, system 200 also includes disadvantages such as the high cost associated with a large number of sensors and associated connections that redundantly measure the same parameter. Because each subsystem is independent, arrival times of data transferred between any of the subsystems is not guaranteed. When parameters being measured are rapidly changing, correlation of data between redundant sensors is much more difficult due to a transfer repetition rate of sensor data on cross-channel buses.

Figure 3:
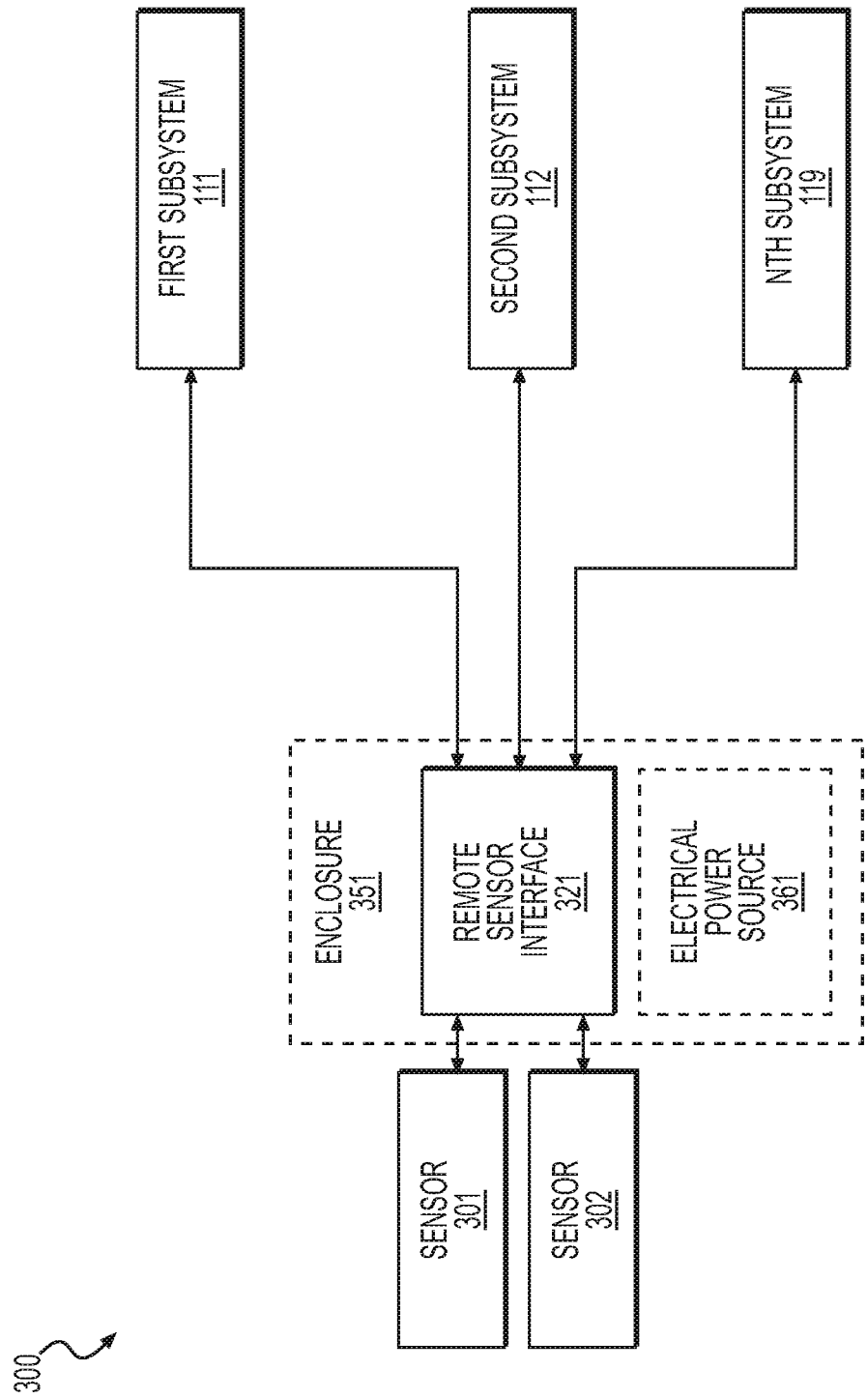
FIG. 3 is a diagram showing a remote sensor data acquisition system, in an embodiment.

FIG. 3 is a diagram showing a remote sensor data acquisition system 300. System 300 may be provided onboard an aircraft/rotorcraft, in an automobile, in a home or other building, and with heating, ventilation, and air conditioning (HVAC) systems. Additionally, system 300 may be used with entertainment systems and internet-of-things (IoT) devices, in which subsystems include remote sensors such that the devices (e.g., lights, furnace, humidifier, and position indicators for garage door closed or main door locked, etc.) may be controlled from a computer without requiring Internet access.

Rather than having N redundant sensors for M subsystems (as in systems 100 and 200), system 300 uses fewer sensors for a given parameter to be measured and each subsystem is independent of every other subsystem. At least one remote sensor is used per parameter to be measured. In certain embodiments, a single sensor is used to measure each parameter. In some embodiments intended for providing critical data (e.g., onboard aircraft), redundant sensors are preferred to avoid failure modes resulting from faulty or missing sensor data. For example, duplicate sensors may be used to measure the same parameter at one location. Alternatively, three or more redundant sensors may be used with a voting algorithm to exclude faulty or missing data from a minority of sensors.

In the embodiment depicted in FIG. 3, duplicate sensors are provided (e.g., sensor 301 and sensor 302) as an example of redundant sensors measuring the same parameter in substantially the same location (e.g., two engine-indicating sensors measuring the same parameter at the same aircraft engine). However, a plurality of parameters may be measured in substantially the same location using additional sensors (not shown). A remote sensor interface 321 is locally provided with sensor 301 and sensor 302, meaning that remote sensor interface 321 is located in substantially the same location as sensor 301 and sensor 302 (e.g., at or near the engine). In certain embodiments, remote sensor interface 321 is physically co-located with sensors 301 and 302. In some embodiments, remote sensor interface 321 is provided in a convenient mounting location that is in immediate proximity with sensors 301 and 302.

Remote sensor interface 321 is for example a communication bus adapted to accommodate a plurality of nodes. This enables remote sensor interface 321 to make available sensor data (e.g., from sensors 301 and 302) for transmitting to a plurality of subsystems (e.g., subsystems 1, 2, . . . M) independently, simultaneously and in real time.

For the FADEC example, first subsystem 111 (e.g., FADEC channel A) and second subsystem 112 (e.g., FADEC channel B) each access all throttle-lever angle sensors independently via remote sensor interface 321. Providing data independence is an important criterion for safety-critical systems.

In certain embodiments, the plurality of nodes within remote sensor interface 321 include a plurality of serial peripheral interface (SPI) buses. The plurality of SPIs may include an SPI for each of the M subsystems, respectively. In certain embodiments, the SPIs have been hardened to withstand challenging environments (e.g., a flight environment) and may be powered independently (e.g., via dedicated batteries). By operating the sensors remotely, the plurality of SPIs make sensor data accessible to M subsystems (e.g., control devices) and transmit the sensor data simultaneously and in real time. SPIs provide uni-directional connections and can be buffered for flow in one direction, and no bits are added to the data sent for clock recovery. These features simplify implementation with standard register gates, reducing overhead. The interface hardware is reusable and may easily be modified to work with a variety of sensor types whose output can be converted and transmitted on multiple digital data buses.

For situations where sensors are distally located from one another (e.g., in a plurality of substantially-distinct locations), an additional remote sensor interface is provided for each location (not shown). For example, a first plurality of sensors may be co-located in a first location for measuring one or more parameters. A first remote sensor interface is co-located in the first location with the first plurality of sensors. The first remote sensor interface provides data from each of the first plurality of sensors independently to a plurality of subsystems in a first time slot. A second plurality of sensors is co-located in a second location, distal from the first location, for measuring one or more parameters. A second remote sensor interface is co-located in the second location with the second plurality of sensors, the second remote sensor interface being adapted to provide data from each of the second plurality of sensors independently to the plurality of subsystems in a second time slot different from the first time slot. Regardless of the number of remote sensor interfaces, they may each communicate independently with each of the plurality of subsystems.

In certain embodiments, remote sensor interface 321 is located within an enclosure 351 (e.g., a metallic enclosure) that includes a source of electrical power for powering remote sensor interface 321 and signal processing circuitry (e.g., for filtering/conditioning sensor signals, and for converting analog signals to digital signals). In some embodiments, the enclosure also includes circuitry for excitation of sensors 301 and 302 and for receiving feedback from sensors 301 and 302, as further described in the example below.

A number of wires running to sensors 301 and 302 from the metallic enclosure (e.g., electrical power, excitation) may exceed those running to each of subsystems 111-119. Having fewer wires running to the subsystems 111-119 further incentivizes locating remote sensor interface 321 in proximity with sensors 301 and 302 and distant from the subsystems 111-119. A significant weight savings may be realized by arranging larger wire bundles to have shorter lengths, which not only reduces weight but also reduces environmental issues such as EMI.

In one example, sensors 301 and 302 form a dual rotary-variable-differential transformer (RVDT) package located at a control wheel for sensing a position of the control wheel in duplicate. Remote sensor interface 321 is located in proximity with the control wheel and electrical power source 361 provides an excitation voltage to primary coils of each RVDT. Secondary coils of the RVDTs receive a feedback signal indicative of a position of the control wheel. The feedback signal is received by remote sensor interface 321 after passing through conditioning, an analog arithmetic circuit, and an analog-to-digital converter to digitize the feedback signal. The digitized feedback signal is made available by remote sensor interface 321 via independent SPI buses such that both values (e.g., positions) from sensors 301 and 302 are made available simultaneously and in real time. Inputs and outputs of the SPI buses are buffered and protected from outside interference (e.g., noise and effects from lightning). The SPI buses allow multiple subsystems to access duplicate control wheel position data for use in control algorithms.

In certain embodiments, the SPI buses of remote sensor interface 321 are adapted to accommodate multiple sensor units, which enables data sharing from multiple sensors connected with each SPI bus. For example, a remote sensor interface may share a set of control wheel position data (e.g., from duplicate sensors) and control lever position data on the same SPI bus and provide both sets of data to the same subsystem (e.g., a flight control subsystem).

In operation, system 300 is used to perform a method that measures a parameter using at least one remote sensor (e.g., sensor 301). A remote sensor interface (e.g., remote sensor interface 321) is co-located with the at least one remote sensor and includes a communication bus adapted to accommodate a plurality of nodes. Data are transmitted from the at least one sensor to a plurality of subsystems (e.g., subsystems 111-119) via the plurality of nodes simultaneously and in real time. In certain embodiments, transmitting of data from the at least one sensor includes transferring data to the plurality of subsystems with guaranteed arrival times for ensuring the data are fresh. In some embodiments, rapidly changing data are correlated between redundant sensors at the remote sensor interface to avoid latency of the data. One or more parameters may be measured using at least one remote sensor per parameter. The one or more parameters may include light intensity, position, velocity, acceleration, humidity, temperature, pressure, and fluid level. Transmitting sensor data to a subsystem may include transmitting data to at least one of a lighting subsystem, a pitch-control subsystem, a roll-control subsystem, a yaw-control subsystem, a FADEC subsystem, and a navigational subsystem. Accessing data via the plurality of subsystems occurs from the at least one remote sensor within appropriate time slots. Providing data from the at least one sensor to a plurality of channels of embedded control maintains independence and reduces latency.

Advantages of system 300 include cost reductions due to a substantial reduction in the number of sensors used to provide adequate measurement of a given parameter for a critical system while maintaining functional independence. The reduced number of sensors also provides a reduction in data conversion steps from each sensor to a control subsystem. Independent measurement is maintained by each sensor while providing data from the respective sensor to a plurality of channels of embedded control, thereby maintaining independence and reducing latency. No programming is required for different implementations of remote sensor interface 321. The resulting embedded electronics provide a more generic architecture, needing only to interface with a digital bus, therefore requiring less design effort and being applicable to multiple configurations.

Timing uncertainty of the parameter measurements is eliminated because each subsystem may access any sensor at the appropriate time slot and each subsystem receives signals from all of the sensors within appropriate time slots. Each subsystem is independent and the arrival time of data transferred to any of the subsystems is guaranteed, ensuring that the data are fresh. In other words, the age of the data is only the time needed for data transfer from the sensors. When parameters being measured (e.g., direction and speed) are rapidly changing, the correlation between sensors occurs at the remote sensor interface, which simplifies the correlation because latency (e.g., latency of transfer repetition rate) has been eliminated. In certain embodiments, no subsystem may deny access to any sensor by any other subsystem. For example, no wiring fault or subsystem crash may deny any subsystem access to any sensor.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A sensor data acquisition system for an aircraft, comprising:
 a plurality of sensors co-located onboard the aircraft and adapted to measure one or more aircraft-related parameters,
  wherein the plurality of sensors comprises duplicate sensors for providing duplicate data of a critical parameter, each duplicate sensor measuring a same parameter;
 a sensor interface co-located with each of the plurality of sensors,
  wherein the sensor interface is configured to correlate rapidly changing data from the redundant duplicate sensors, and the sensor interface comprises a communication bus having a plurality of nodes enabling each of the plurality of sensors to transmit correlated data simultaneously in a time slot to the sensor interface via a corresponding node of the plurality of nodes;
 a plurality of subsystems located distally from the sensor interface,
  wherein each of the plurality of subsystems is adapted to receive correlated data independently, simultaneously, and in real time via the sensor interface from each of the plurality of sensors;
 a plurality of wired pathways pathways configured to provide unshared communication paths that extend directly between each of the respective plurality of subsystems and the sensor interface,
  wherein each of the plurality of wired pathways lack intermediate nodes and intermediate processing, such that an age of the correlated data is only the time needed for data transferred to each of the plurality of subsystems via a respective one of the plurality of wired communication pathways, and
  wherein one or more second sensor interfaces associated with corresponding second pluralities of sensors comprising duplicate sensors uses corresponding second pluralities of wired pathways configured to provide unshared communication paths extending directly between each of the plurality of subsystems and each of the second sensor interfaces.

2. The system of claim 1 wherein each of the plurality of nodes of the sensor interface comprises a serial peripheral interface bus for communicatively coupling with every subsystem of the plurality of subsystems, respectively, for independently communicating with each of the plurality of subsystems.

3. The system of claim 1 wherein the plurality of subsystems are selected from the group comprising a lighting subsystem, a pitch-control subsystem, a roll-control subsystem, a yaw-control subsystem, a FADEC subsystem, and a navigational subsystem.

4. The system of claim 1 wherein the plurality of sensors includes sensors selected from the group comprising a light sensor, a position sensor, a velocity sensor, an acceleration sensor, a temperature sensor, a humidity sensor, a pressure sensor, and a fluid-level sensor.

5. The system of claim 1 wherein an arrival time of correlated data transferred to any of the plurality of subsystems is solely the time needed for transfer from the sensor interface ensuring that the correlated data are fresh and eliminating timing uncertainty of the rapidly changing data.

6. The system of claim 1 wherein the plurality of direct communication pathways comprise a plurality of communication wires that independently connect the sensor interface with every one of the plurality of subsystems, respectively.

7. A sensor data acquisition method for an aircraft, comprising:
 providing a sensor interface co-located with a plurality of sensors onboard the aircraft, wherein the sensor interface comprises a communication bus adapted to accommodate a plurality of nodes, and wherein the plurality of sensors comprises duplicate sensors configured to redundantly measure a same parameter;
 receiving data from each of the plurality of sensors, wherein each of the plurality of sensors is wired directly to a respective one of the plurality of nodes;
 correlating redundantly measured sensor data between duplicate sensors via the sensor interface to provide correlated sensor data for the same parameter and avoid latency by transferring the correlated sensor data from the sensor interface;
 simultaneously transmitting correlated sensor data from the sensor interface to a plurality of subsystems via a plurality of wired communication pathways, respectively, wherein each of the plurality of wired communication pathways is unshared and lacks intermediate nodes or intermediate processing; and wherein each of the plurality of subsystems are configured for periodically accessing the correlated sensor data from the sensor interface via a respective one of the plurality of wired communication pathways.

8. The method of claim 7 further comprising sensing one or more parameters selected from the group comprising light intensity, position, velocity, acceleration, humidity, temperature, pressure, and fluid level.

9. The method of claim 7 wherein transmitting sensor data comprises transmitting correlated sensor data via the sensor interface to one or more of a lighting subsystem, a pitch-control subsystem, a roll-control subsystem, a yaw-control subsystem, a FADEC subsystem, and a navigational subsystem.

10. The method of claim 7 further comprising providing data from the plurality of sensors to a plurality of channels of embedded control for maintaining independence and reducing latency.

11. The method of claim 7 wherein the plurality of independent communication pathways comprise a plurality of communication wires from the sensor interface to each of the plurality of subsystems, respectively.

12. A remote sensor data acquisition system onboard an aircraft, comprising:
a first plurality of sensors co-located in a first location for measuring a first plurality of parameters, respectively;
a first remote sensor interface co-located in the first location with the first plurality of sensors, the first remote sensor interface being adapted to transmit sensor data from each of the first plurality of sensors independently in a first time slot;
wherein the first plurality of sensors comprises two or more replicate sensors for measuring each parameter of the first plurality of parameters, each replicate sensor measuring a same parameter, and sensor data from the two or more replicate sensors is correlated at the first remote sensor interface to avoid latency of the data;
a second plurality of sensors co-located in a second location, distal from the first location, for measuring a second plurality of parameters, respectively;
a second remote sensor interface co-located in the second location with the second plurality of sensors, the second remote sensor interface being adapted to transmit sensor data from each of the second plurality of sensors independently in a second time slot different from the first time slot;
wherein the second plurality of sensors comprises two or more replicate sensors for measuring each parameter of the second plurality of parameters, each replicate sensor measuring a same parameter, and sensor data from the two or more replicate sensors is correlated at the second remote sensor interface to avoid latency of the data;
a plurality of subsystems each located distally from the first location and the second location;
a first plurality of unshared communication pathways wired directly between the first remote sensor interface and each of the plurality of subsystems to avoid any intermediate nodes or processing, wherein correlated sensor data is received from the first remote sensor interface simultaneously in the first time slot such that access to correlated sensor data may not be delayed; and
a second plurality of unshared communication pathways wired directly between the second remote sensor interface and the plurality of subsystems to avoid any intermediate nodes or processing, wherein sensor data is received from the second remote sensor interface simultaneously in the second time slot such that access to correlated sensor data may not be delayed.

13. The remote sensor data acquisition system of claim 12, wherein the first remote sensor interface is located within a first enclosure, the first enclosure having a source of electrical power for powering the first remote sensor interface and signal processing circuitry for processing signals from the first plurality of sensors.

14. The remote sensor data acquisition system of claim 13 wherein the source of electrical power comprises a dedicated electrical power source located within the first enclosure.

15. The remote sensor data acquisition system of claim 13, wherein the signal processing circuitry of the first enclosure comprises circuitry for excitation of the first plurality of sensors and for receiving feedback from the first plurality of sensors.

16. The remote sensor data acquisition system of claim 12, comprising:
a first plurality of wires configured to communicatively couple the first remote sensor interface with the first plurality of sensors, respectively; and
a second plurality of wires configured to communicatively couple the second remote sensor interface with the second plurality of sensors, respectively.

17. The remote sensor data acquisition system of claim 16 wherein a number of the first plurality of wires exceeds a number of the first plurality of unshared communication pathways wired directly between the first remote sensor interface and the plurality of subsystems.

18. The remote sensor data acquisition system of claim 12 wherein the first remote sensor interface provides the sensor data from each of the first plurality of remote sensors to a respective plurality of channels of embedded control.

19. The remote sensor data acquisition system of claim 12 wherein:
the first plurality of sensors comprise a pair of rotary-variable-differential transformers co-located at a control wheel for sensing a position of the control wheel in duplicate;
the first remote sensor interface is co-located at the control wheel;
the second plurality of sensors comprise a plurality of throttle-lever angle sensors co-located at a throttle lever for sensing a position of the throttle lever in replicate;
the second remote sensor interface is co-located at the throttle lever; and
the plurality of subsystems comprise a flight control subsystem, a FADEC subsystem, and a navigational subsystem.

* * * * *